(12) United States Patent
Chang et al.

(10) Patent No.: US 9,803,682 B1
(45) Date of Patent: Oct. 31, 2017

(54) SUCTION CUP DEVICE

(71) Applicants: Tsung-Chih Chang, Taichung (TW); Yuan-Po Chang, Taichung (TW)

(72) Inventors: Tsung-Chih Chang, Taichung (TW); Yuan-Po Chang, Taichung (TW)

( * ) Notice: Subject to any disclaimer, the term of this patent is extended or adjusted under 35 U.S.C. 154(b) by 0 days.

(21) Appl. No.: 15/596,598

(22) Filed: May 16, 2017

(30) Foreign Application Priority Data

Aug. 11, 2016 (TW) .............................. 105125576 A

(51) Int. Cl.
*F16M 13/00* (2006.01)
*F16B 47/00* (2006.01)

(52) U.S. Cl.
CPC .................... *F16B 47/00* (2013.01)

(58) Field of Classification Search
USPC .......................................................... 248/542
See application file for complete search history.

(56) References Cited

U.S. PATENT DOCUMENTS

| 7,913,963 | B2* | 3/2011 | Cheng | B60R 11/02 248/205.5 |
| 2003/0230694 | A1* | 12/2003 | Kalb | B25J 15/0616 248/363 |
| 2005/0205744 | A1* | 9/2005 | Singh | F16B 47/00 248/351 |
| 2005/0218278 | A1* | 10/2005 | Hsu | F16B 47/00 248/205.5 |
| 2007/0246621 | A1* | 10/2007 | Akai | F16B 47/00 248/205.5 |
| 2012/0175484 | A1* | 7/2012 | Hao | F16B 47/00 248/363 |
| 2015/0240862 | A1* | 8/2015 | Shi | F16B 47/00 248/205.8 |

* cited by examiner

*Primary Examiner* — Monica Millner
(74) *Attorney, Agent, or Firm* — Burris Law, PLLC

(57) ABSTRACT

A suction cup device includes a suction cup having a plug hole, a plug member movably disposed in the plug hole, a positioning seat connected to the suction cup, a pressing member movably inserted into the positioning seat, an air storage space defined by the positioning seat, the pressing member and the suction cup, and an air vent channel communicating the air storage space with an ambient environment. A manual air vent valve is disposed on and is movable along with said pressing member to switch the air vent channel between closed and open states, where the air storage space is sealed and air in the air storage space is released to the ambient environment through the air vent channel, respectively.

7 Claims, 11 Drawing Sheets

SUCTION CUP DEVICE

CROSS-REFERENCE TO RELATED APPLICATION

This application claims priority of Taiwanese Patent Application No. 105125576, filed on Aug. 11, 2016.

FIELD

The disclosure relates to a suction cup device, more particularly to a suction cup device that can stably adhere to a surface.

BACKGROUND

Referring to FIGS. 1 and 2, a conventional suction cup device includes an elastically deformable suction disk 1, a pressing member 2 connected to the suction disk 1, a cover member 3 sleeved on the pressing member 2 and connected to the suction disk 1, and a spring 4 abutting between the cover member 3 and the pressing member 2. The suction disk 1 has a bottom surface 101 that is concave, and a cavity 102 formed in the bottom surface 101. To use the conventional suction cup device, the suction disk 1 is brought to abut against a support surface (not shown), and a pressing force is exerted on the pressing member 2, so that the suction disk 1 is deformed into a flat shape, as shown in FIG. 2. Air in the cavity 102 is squeezed out therefrom so as to flatten the cavity 102 and adhere the bottom surface 101 to the support surface. At this time, a low pressure state exists between the bottom surface 101 and the adhered support surface.

The action of the spring 4 is intended to generate a reverse force between the cover member 3 and the pressing member 2, and by using the biasing force of the spring 4, a periphery of the cover member 3 can press against a periphery of the suction disk 1. However, after using the conventional suction cup device for some time, air may penetrate between the bottom surface 101 and the adhered support surface. Through the biasing action of the suction disk 1, the suction disk 1 is restored to its original state, as shown in FIG. 1. Thus, the suction force of the suction disk 1 is deteriorated. If a user can discover it in time, he/she can press the pressing member 2 again so as to flatten the bottom surface 101 of the suction disk 1 and squeeze the air out therefrom. But if not, the conventional suction cup device is likely to fall off from the adhered support surface.

Referring to FIGS. 3 and 4, another conventional suction cup device, as disclosed in Taiwanese Patent No. M380400, includes a protrusion 5, a reinforcing member 6 and a suction member 7. In a normal state, a gap 8 is formed between the reinforcing member 6 and the suction member 7. In use, the protrusion 5 is depressed, the reinforcing member 6 and the suction member 7 are elastically deformed, and air in the reinforcing member 6 and air in the suction member 7 are squeezed out, so that the gap 8 disappears, and the reinforcing member 6 and the suction member 7 are adhered flatly to a support surface (S), as shown in FIG. 4. As such, the speed of return pressure can be reduced through the reinforcing member 6 and the suction member 7. However, after using the aforesaid conventional suction cup device for some time, air may still penetrate between the reinforcing member 6 and the suction member 7, so that a user must remove and depress again the suction cup device against the support surface (S). Hence, use of this suction cup device is unreliable.

When use in large-scale machinery, some special suction cup devices use vacuum pumps and switchable solenoid valves for adhering a workpiece to be transported, but their structures are rather complicated and must cooperate with a variety of electronic control facilities, which are not suitable to be applied in suction disks used in daily life.

SUMMARY

Therefore, an object of the present disclosure is to provide a suction cup device that that can alleviate at least one of the drawbacks of the prior arts.

Accordingly, a suction cup device of this disclosure includes a suction cup, a plug member, a cover unit and a manual air vent valve. The suction cup includes a disk portion having a deformable abutment surface configured to adhere to a surface, and a cup body connected to the disk portion and surrounding an axis. The cup body defines a chamber, and has a plug hole communicating with the chamber. The plug member is movably disposed in the plug hole. The cover unit includes a positioning seat airtightly connected to and covering the cup body, a pressing member movably inserted into the positioning seat, an air storage space cooperatively defined by the positioning seat, the pressing member and the cup body, and an air vent channel communicating the air storage space with an ambient environment. The air storage space has a variable volume and is communicable with the chamber through the plug member. The positioning seat has a tubular shape and includes a peripheral wall surrounding the axis, and a retaining ring connected to one end of the peripheral wall and defining a through hole. The pressing member is inserted into the positioning seat through the through hole. At least a portion of the pressing member is exposed from the positioning seat. The pressing member includes an annular stop portion protruding from an outer peripheral surface thereof.

The manual air vent valve is disposed on the pressing member, and includes a protruding ring protruding from the outer peripheral surface of the pressing member and integrally formed as one piece with the annular stop portion, an annular flange protruding outwardly and transversely from an end of the pressing member and spaced apart from the protruding ring, an annular groove formed between the protruding ring and the annular flange, an airtight ring disposed in the annular groove, and a plurality of angularly spaced-apart flow guide holes extending through the protruding ring and the annular stop portion and communicating with the annular groove and the through hole. The protruding ring has an annular face facing the annular groove. The annular flange has an annular face facing the annular groove and the annular face of the protruding ring. The airtight ring has a circular cross section, and a diameter smaller than a width of the annular groove measured in a direction transverse to the axis such that the airtight ring is movable in the annular groove along the axis between a first position, where the airtight ring airtightly abuts against the annular face of the annular flange to close communication between the air storage space and the air vent channel, and a second position, where the airtight ring is moved away from the annular face of the annular flange to open the communication between the air storage space and the air vent channel. The manual air vent valve is movable along with the pressing member to switch the air vent channel between a closed state, where the air storage space is sealed, and an open state, where air in the air storage space is released to the ambient environment through the air vent channel.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
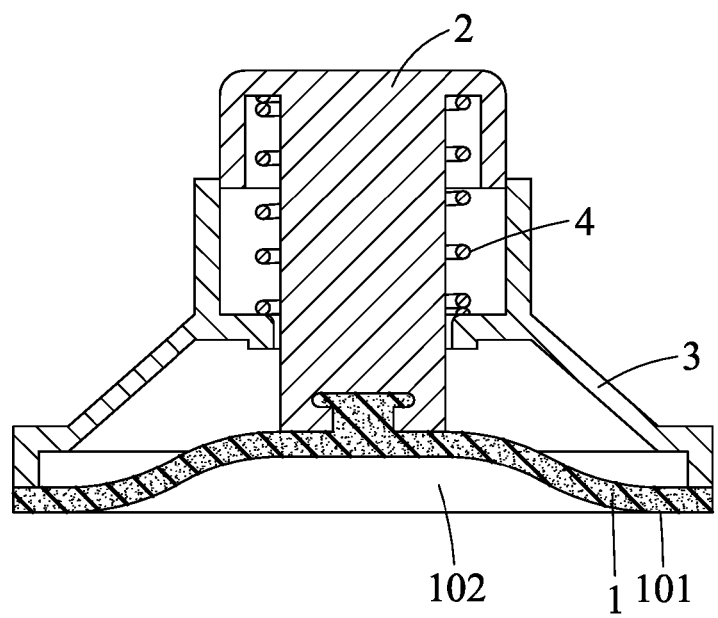
FIG. 1 is a sectional view of a conventional suction cup device.
Figure 2:
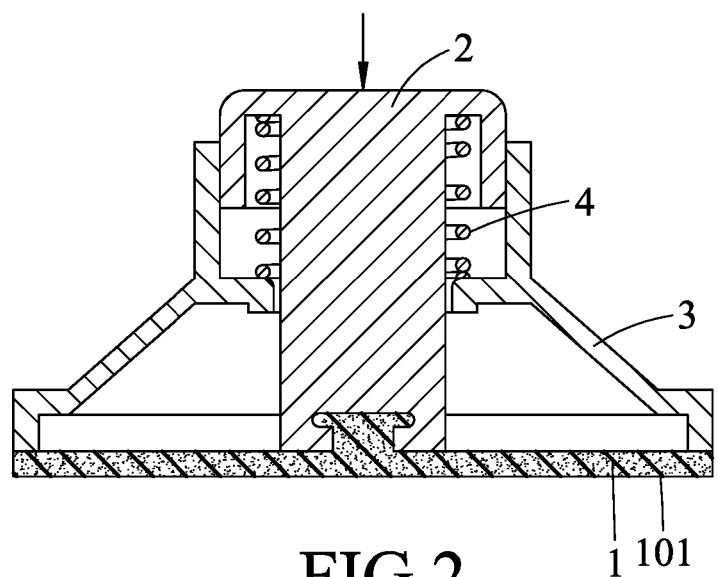
FIG. 2 is a view similar to FIG. 2, but illustrating the conventional suction cup device in a state of use.
Figure 3:
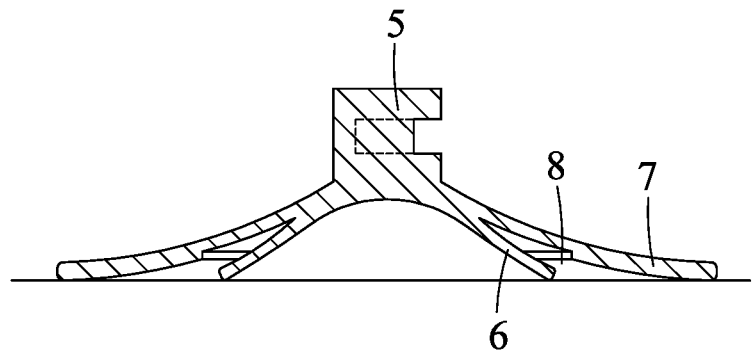
FIG. 3 is a sectional view of another conventional suction cup device disclosed in Taiwanese Patent No. M380400.
Figure 4:
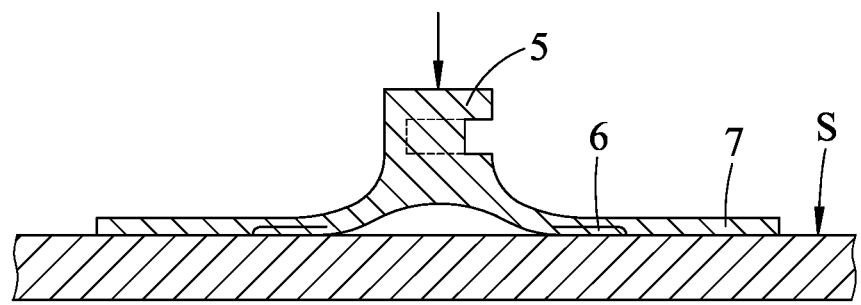
FIG. 4 is a view similar to FIG. 3, but illustrating the another conventional suction cup device in a state of use.

Referring to FIGS. 5 to 8, a suction cup device 600 according to the embodiment of the present disclosure is shown to include a suction cup 10, a plug member 20, a cover unit 30, a manual air vent valve 40 and two warning units 50. The suction cup device 600 is configured to be adhered to a support surface 100.

The suction cup 10 includes a hollow circular disk portion 11, and a cup body 12 airtightly connected to the disk portion 11 and surrounding an axis (L).

The disk portion 11 is made of a soft plastic material capable of elastic deformation, defines a central hole 113, and has a deformable abutment surface 111 configured to adhere to the support surface 100, and a connecting portion 112 in the form of an annular groove and opposite to the abutment surface 111 along the axis (L). The cup body 12 has a U-shaped cross section with a single opening, and includes a cup surrounding wall 121 surrounding the axis (L), and an end wall 122 connected transversely to one end of the cup surrounding wall 121 opposite to the disk portion 11. The cup surrounding wall 121 and the end wall 122 cooperatively define a chamber 13 communicating with the central opening 113. An end of the cup surrounding wall 121 having the opening is airtightly inserted into the disk portion 11. The end wall 122 has a plug hole 123 extending along the axis (L) and communicating with the chamber 13. The plug hole 123 is a tapered hole having a narrow end proximate to the chamber 13 and a wide end opposite to the chamber 13. The end wall 122 further has a slope surface 124 having an outer periphery connected to an outer surface of the end wall 122, and an inner periphery connected to the wide end of the plug hole 123.

Figure 8:
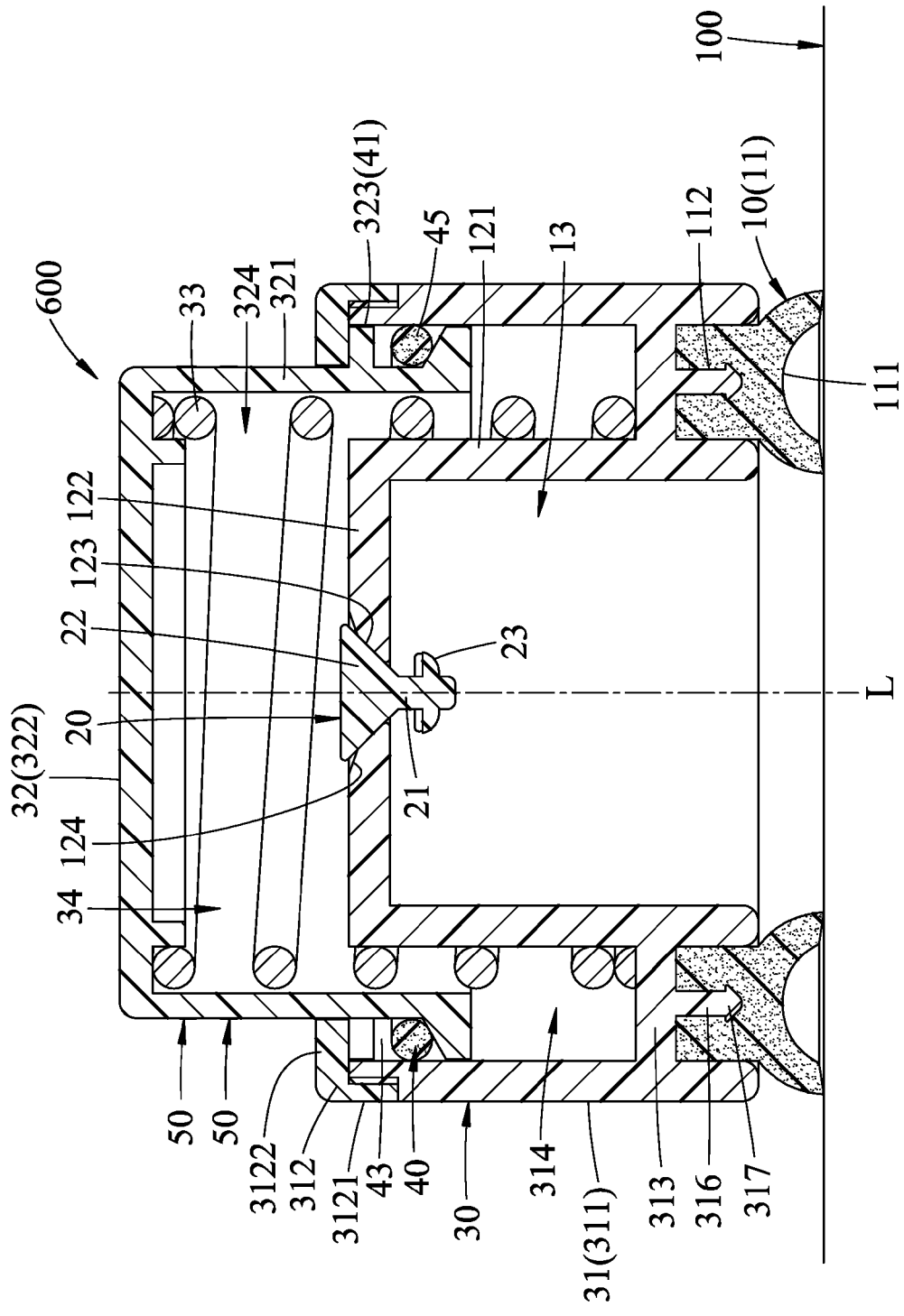
FIG. 8 is an assembled sectional view of the embodiment.
Figure 10:
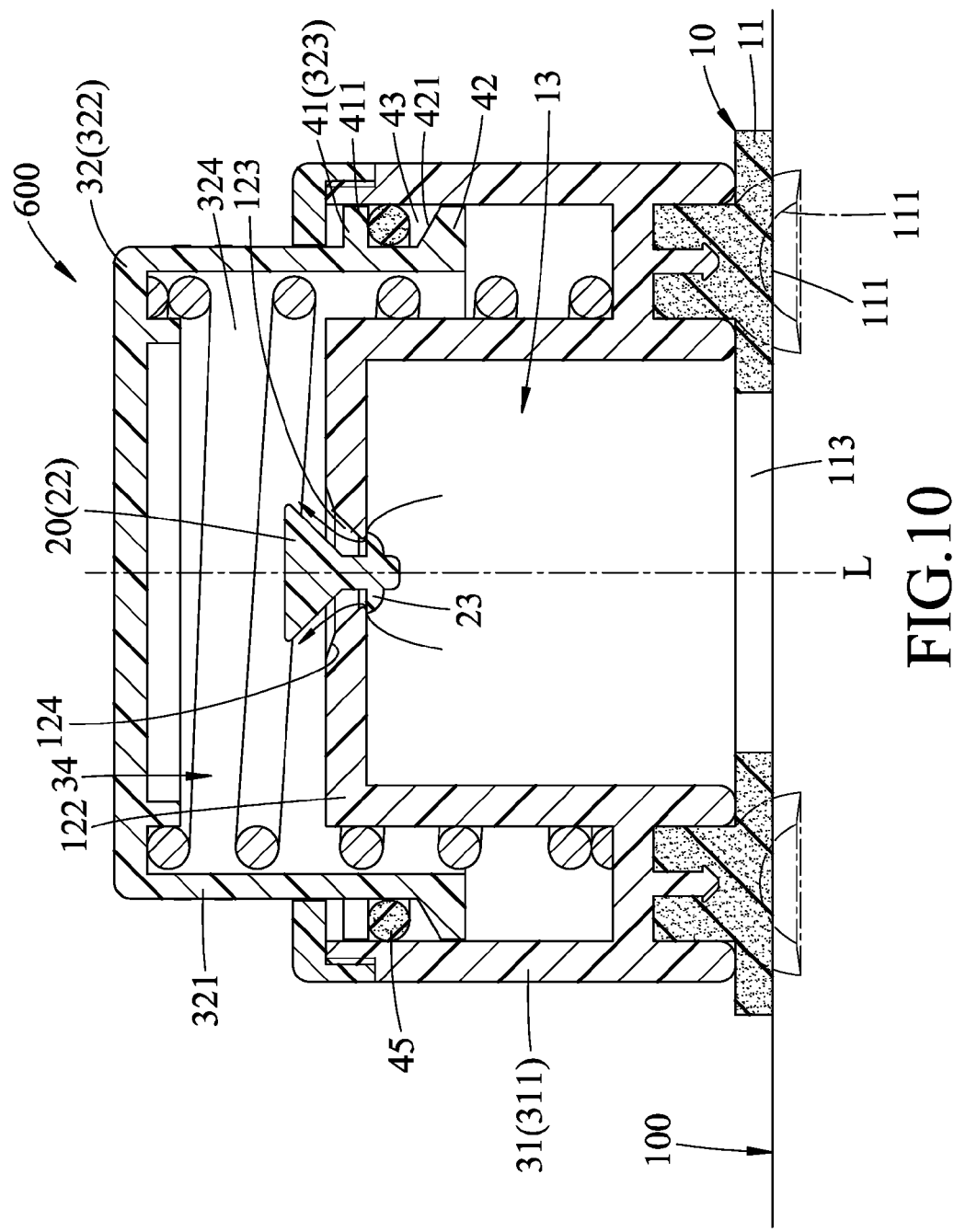
FIG. 10 is a view similar to FIG. 8, but illustrating a pressing member being pressed to permit a suction cup of the embodiment to adhere to a support surface.

The plug member 20 is movably disposed in the plug hole 123, and includes a conical plug body 22 disposed in the plug hole 123, an extension 21 extending from the plug body 22 toward the chamber 13 along the axis (L), and a limiting block 23 extending outwardly and transversely from an outer peripheral surface of the extension 21 and located in the chamber 13. The plug body 22 is movable between a closed state, as shown in FIG. 8, where the plug body 22 is airtightly received in the plug hole 123, and an open state, as shown in FIG. 10, where the plug body 22 is moved away from the plug hole 123. In the closed state, a top portion of the plug body 22 is not in contact with the plug hole 123 because of the presence of the slope surface 124.

Figure 9:
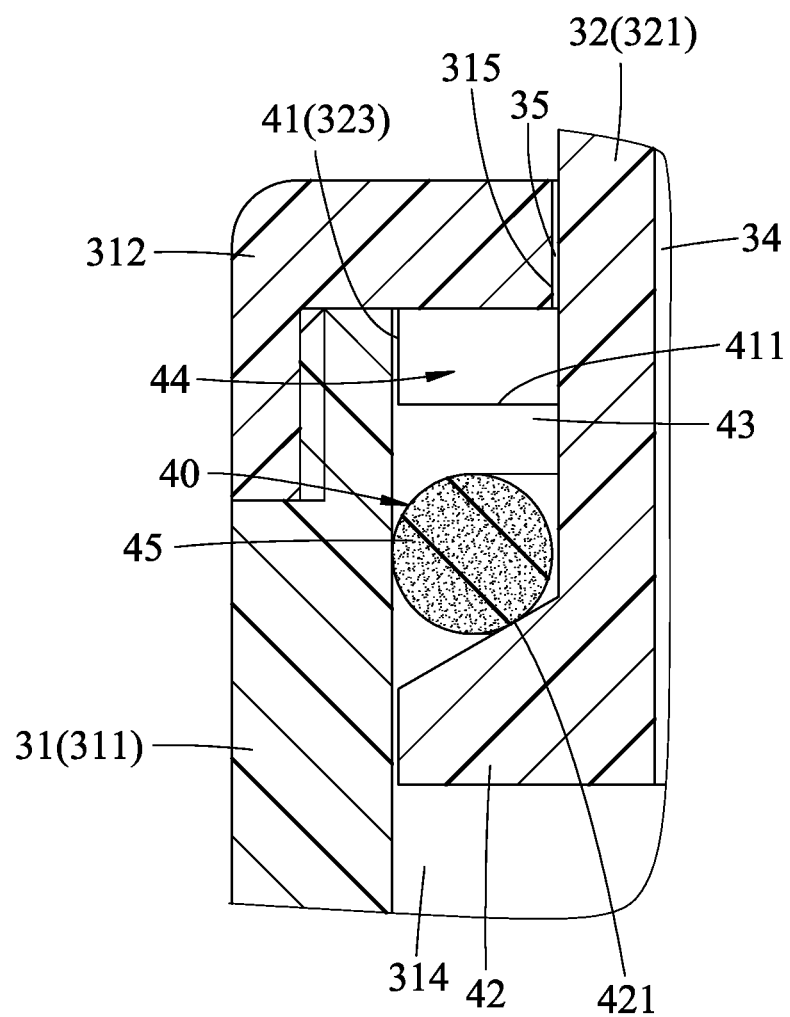
FIG. 9 is an enlarged sectional view of a portion of FIG. 8, illustrating a manual air vent valve of the embodiment in a closed position.

Referring to FIG. 9, the cover unit 30 is connected to the suction cup 10, covers the cup body 12, and includes a positioning seat 31, a pressing member 32, an air storage space 34, an elastic member 33, and an air vent channel 35.

The positioning seat 31 is airtightly connected to the cup body 12, has a tubular shape, and includes a peripheral wall 311 surrounding the axis (L), an annular protrusion 318 projecting axially from an end of the peripheral wall 311 away from the disk portion 11 and having an external thread, a retaining ring 312, and an annular positioning plate 313. The retaining ring 312 includes a cylindrical body portion 3121 having an internal thread, and an annular flange 3122 extending inwardly and transversely from the cylindrical body portion 3121 and defining a through hole 315. The retaining ring 312 is connected to the peripheral wall 311 through threaded connection between the internal thread of the cylindrical body portion 3121 and the external thread of the annular protrusion 318. The annular positioning plate 313 is connected between the peripheral wall 311 and the cup surrounding wall 121 at a position proximate to the disk portion 11. The end wall 122 is proximate to the retaining ring 312. In this embodiment, the peripheral wall 311, the positioning plate 313 and the cup body 12 are integrally formed as one piece, and cooperate with the retaining ring 312 to define a first space 314.

The positioning seat 31 further includes an annular connecting member 316 that surrounds the axis (L), that projects from the positioning plate 313 into the annular groove 112 of the disk portion 11, and that has a hook end 317 releasably engaged to the annular groove 112. The connection of the connecting member 316 with the disk portion 11 is enhanced through the hook end 317. The positioning seat 31 can thus be releasably connected to the suction cup 10 through the connecting member 316.

The pressing member 32 is movably inserted into the positioning seat 31 through the through hole 315, and is located between the positioning seat 31 and the cup body 12. The pressing member 32 has a U-shaped cross section, and includes a cylindrical peripheral wall 321 surrounding the axis (L), an end wall 322 connected transversely to one end of the peripheral wall 321 and located externally of the positioning seat 31, and an annular stop portion 323 protruding from an outer peripheral surface of the peripheral wall 321 in proximity to the other end thereof opposite to the end wall 322. The peripheral wall 321 and the end wall 322 cooperate with each other to define a second space 324 communicating with the first space 314. The first space 314 and the second space 324 cooperatively form the air storage space 34. The stop portion 323 is located in the first space 314, and is abuttable against the retaining ring 312 to achieve a positioning effect. The wide end of the plug hole 123 is proximate to the air storage space 34.

The air storage space 34 is cooperatively defined by the positioning seat 31, the pressing member 32 and the cup body 12. Further, the air storage space 34 has a variable volume, and communicates with the chamber 13 when the plug member 20 is in the open state.

The elastic member 33 of this embodiment is a pre-compressed spring, but is not limited thereto, and may be an elastic sheet, a rubber gasket, etc. The elastic member 33 is sleeved on an outer peripheral surface of the cup surrounding wall 121, and has one end abutting against the end wall 322, and another end abutting against the positioning plate 313. Further, the elastic member 33 generates a restoring force biasing the pressing member 32 to move in a direction opposite to the disk portion 11 and to protrude from the positioning seat 31. Because of the restoring force of the elastic member 33, the volume of the air storage space 34 can be expanded, thereby generating an effect of drawing air from and reducing the pressure in the chamber 13.

The manual air vent valve 40 is disposed on the pressing member 32, and includes a protruding ring 41 protruding from the outer peripheral surface of the peripheral wall 321 and integrally formed as one piece with the annular stop portion 323, an annular flange 42 protruding outwardly and transversely from the other end of the peripheral wall 321 and spaced apart from the protruding ring 41, an annular groove 43 formed between the protruding ring 41 and the annular flange 42, a plurality of angularly spaced-apart flow guide holes 44 extending through the protruding ring 41 and the stop portion 323 and communicating with the annular groove 43 and the through hole 315, and an airtight ring 45 disposed in the annular groove 43.

The protruding ring 41 has an annular face 411 facing the annular groove 43. The annular flange 42 has an annular face 421 facing the annular groove 43 and the annular face 411 and extending inclinedly from an outer peripheral edge of the annular flange 42 toward the peripheral wall 321 along the axis (L). The airtight ring 45 has a circular cross section, and a diameter smaller than a width of the annular groove 43 measured in a direction transverse to the axis (L), such that the airtight ring 45 is movable in the annular groove 43 along the axis (L) between a first position (see FIGS. 8 and 9), where the airtight ring 45 airtightly abuts against the annular face 421 of the annular flange 42 to close communication between the first space 314 and the air vent channel 35, and a second position (see FIGS. 10 and 11), where the airtight ring 45 is moved away from the annular face 421 to open the communication between the first space 314 and the air vent channel 35.

The air vent channel 35 communicates the air storage space 34 with an ambient environment, and is composed of a space among the flow guide holes 44, the peripheral wall 311 of the positioning seat 31 and the peripheral wall 321 of the pressing member 32, and a space between a hole wall of the through hole 315 and the peripheral wall 321. The manual air vent valve 40 is movable along with the pressing member 32 to switch the air vent channel 35 between a closed state, as shown in FIGS. 9 and 12, where the air storage space 34 is sealed, and an open state, as shown in FIG. 11, where air in the air storage space 34 is released to the ambient environment through the air vent channel 35.

The warning units 50 are disposed on the outer peripheral surface of the peripheral wall 321 spaced apart from each other along the axis (L), and are located between the stop portion 323 and the end wall 322. In this embodiment, the warning units 50 are proximate to the end wall 322. Each warning unit 50 has a ring shape and a color different from that of the peripheral wall 321.

With reference to FIGS. 8 and 9, when the suction cup device 600 is not in use, the abutment surface 111 of the disk portion 11 has a semi-circular cross section, and the plug body 22 of the plug member 20 is disposed in the closed state. Further, a portion of the pressing member 32 protrudes out of the positioning seat 31 due to the restoring force of the elastic member 33, the annular stop portion 323 of the pressing member 32 abuts against the retaining ring 312, the air storage space 34 has the maximum volume, and the airtight ring 45 is in the first position.

Figure 11:
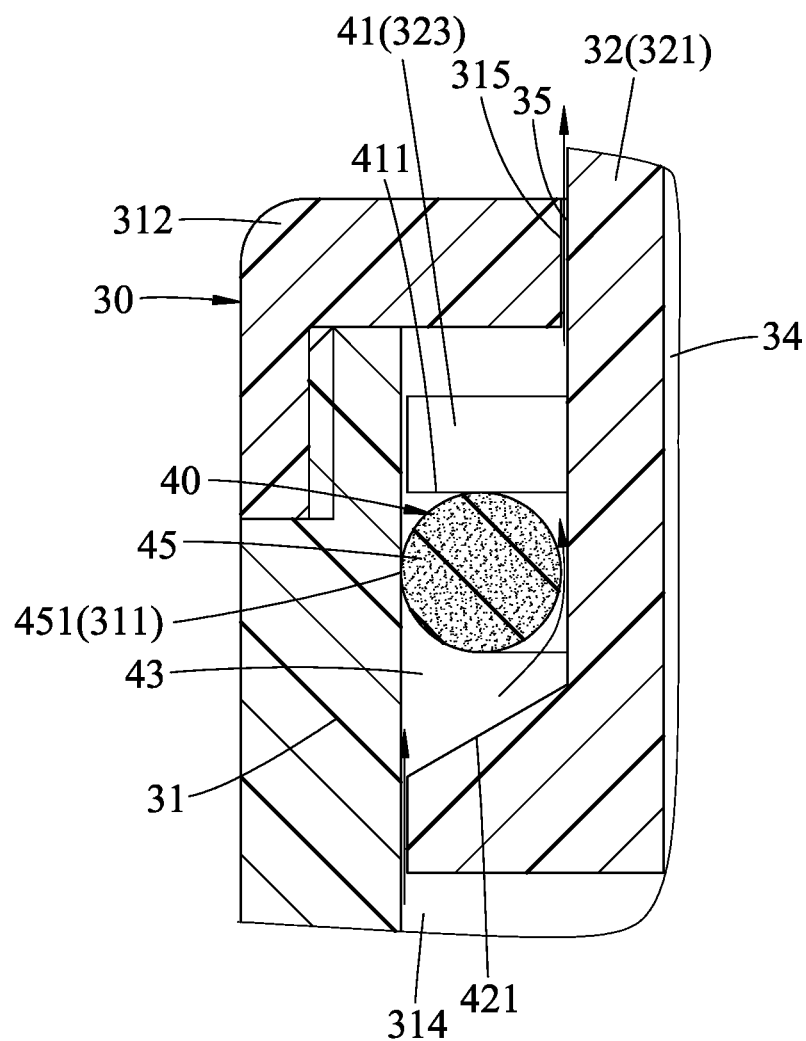
FIG. 11 is an enlarged sectional view of a portion of FIG. 10, illustrating the manual air vent valve of the embodiment in an open position.
Figure 12:
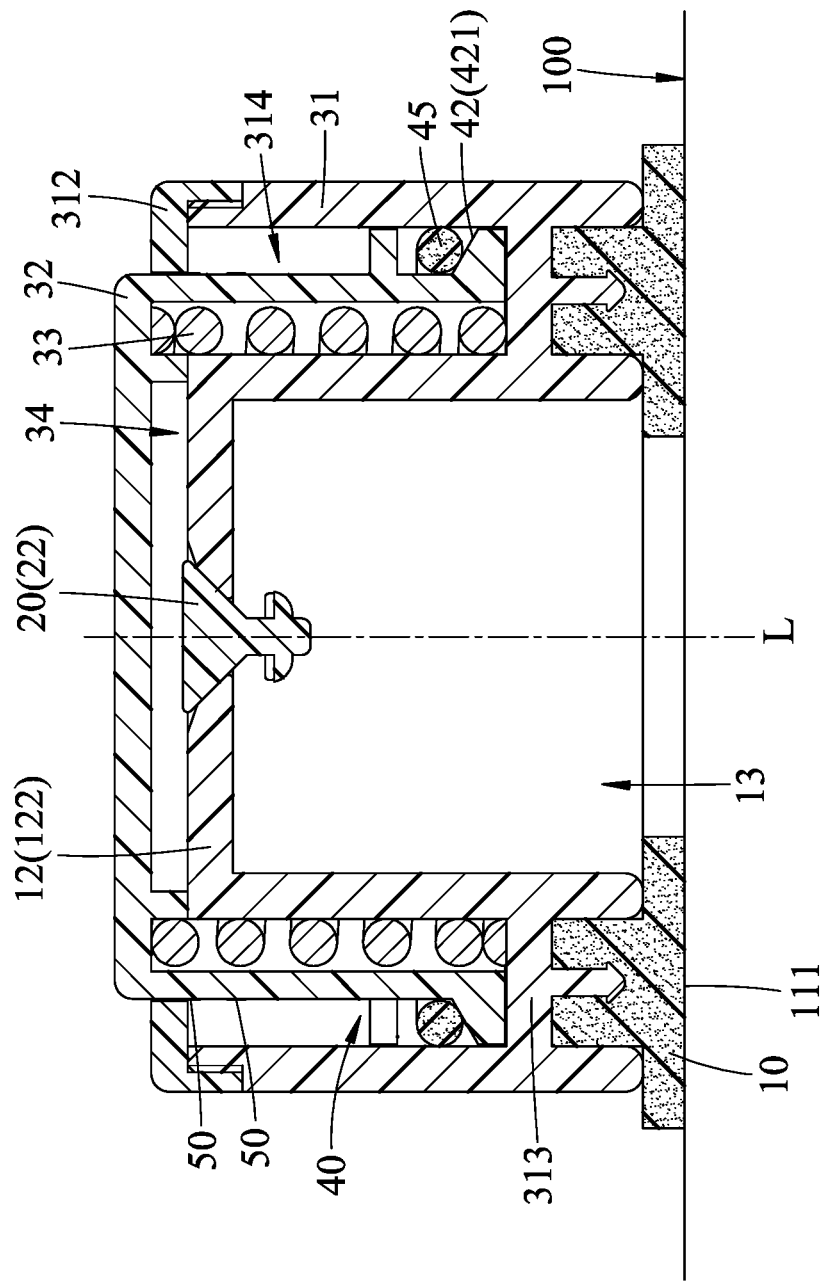
FIG. 12 is a view similar to FIG. 10, but illustrating the pressing member being pressed further until an annular flange of the manual air vent valve abuts against a positioning plate.

With reference to FIGS. 10 to 12, to use the suction cup device 600, the end wall 322 of the pressing member 32 is pressed with force to abut the abutment surface 111 of the disk portion 11 against the support surface 100 to be adhered. At this time, the abutment surface 111 is deformed to have a flat shape (from imaginary lines to solid lines shown in FIG. 10). Air originally existed in the disk portion 11 is squeezed and flows into the chamber 13 via the central hole 113. Because air originally existed in the chamber 13 is squeezed by the air from the disk portion 11, the air in the chamber 13 is urged to push the plug body 22 away from the plug hole 123, so that a clearance is formed between the plug hole 123 and the plug body 22, thereby permitting the air to flow from the chamber 13 into the air storage space 34. Furthermore, through the presence of the slope surface 124, the plug body 22 can be smoothly driven by the air pressure in the chamber 13 to move away from the plug hole 123. Because there is friction between an outer circumferential surface 451 of the airtight ring 45 and the peripheral wall 311 of the positioning seat 31, as the pressing member 32 moves into the first space 314, a clearance is formed between the airtight ring 45 and the annular face 421 of the annular flange 42, thereby placing the manual air vent valve 40 in the open state. Air in the air storage space 34 can then flow along the clearance between the airtight ring 45 and the annular face 421 and be released to the ambient environment through the air vent channel 35 (see air flow direction represented by arrows in FIG. 11). The pressing member 32 is pressed continuously to move further into the first space 314 until the annular flange 42 abuts against the positioning plate 313 (see FIG. 12). At this time, the elastic member 33 is compressed to store a restoring force, the manual air vent valve 40 is placed in the closed state, and the suction cup device 600 is adhered to the support surface 100.

Figure 13:
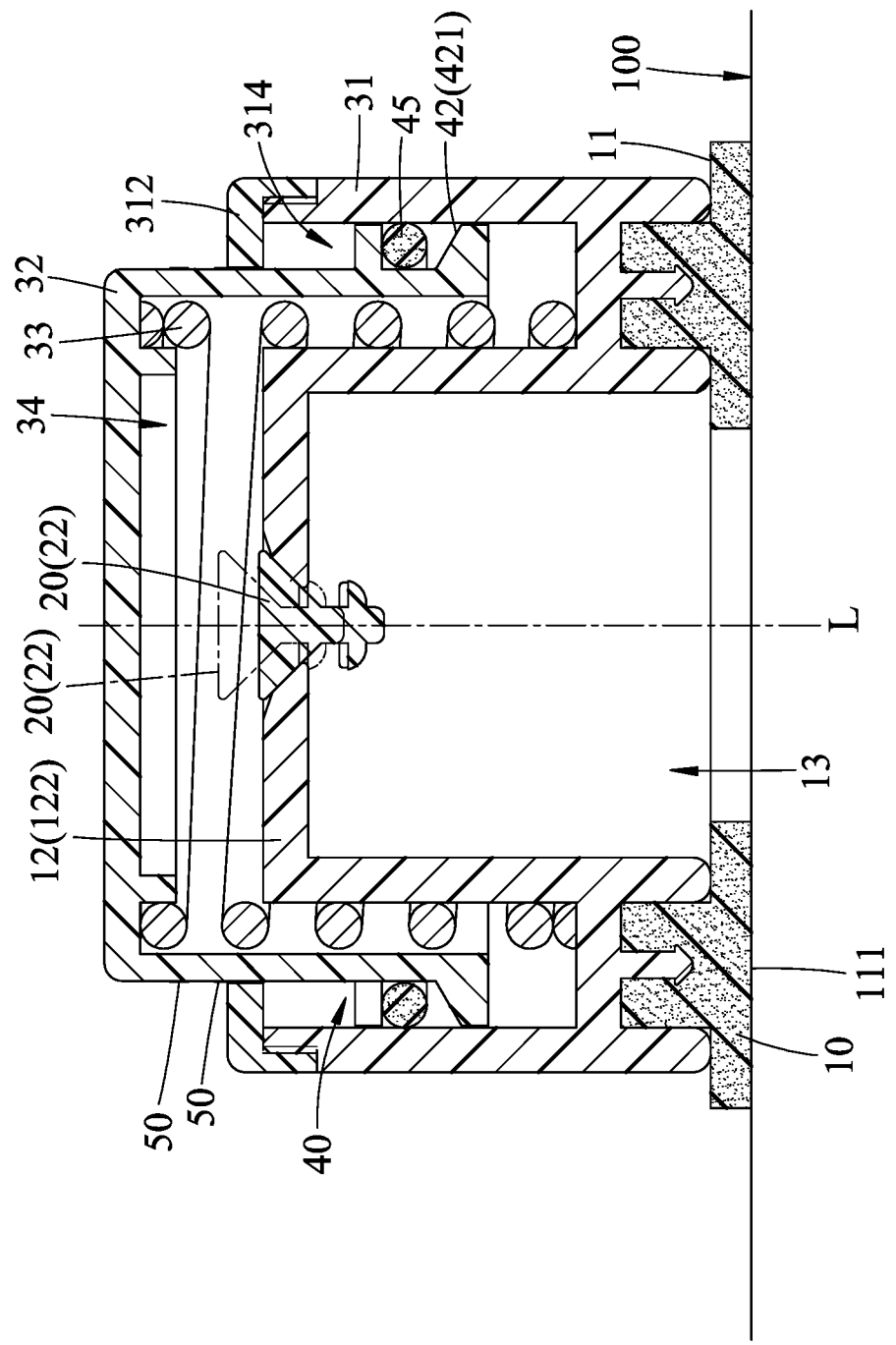
FIG. 13 is a view similar to FIG. 12, but illustrating how air entering a chamber of a suction cup from a gap between a disk portion of the suction cup and an adhered support surface can flow from a plug member to an air storage space.

Referring to FIG. 13, after using the suction cup device 600 for a period of time, ambient air may penetrate between the disk portion 11 and the adhered support surface 100, thereby increasing the air pressure inside the chamber 13. Because the air storage space 34 has a function of drawing air and reducing the air pressure inside the chamber 13, when the air pressure inside the chamber 13 is higher than that inside the air storage space 34, based on the pressure balance effect, air inside the chamber 13 will flow through the plug hole 123 into the air storage space 34 after pushing the plug body 22 away from the plug hole 123. As the air from the chamber 13 flows into the air storage space 34, the pressing member 32 will gradually move away from the positioning seat 31, and through the restoring force of the elastic member 33, the annular face 421 of the annular flange 42 remains abutting against the airtight ring 45, so that the manual air vent valve 40 is maintained in the closed state (see FIG. 9).

Figure 5:
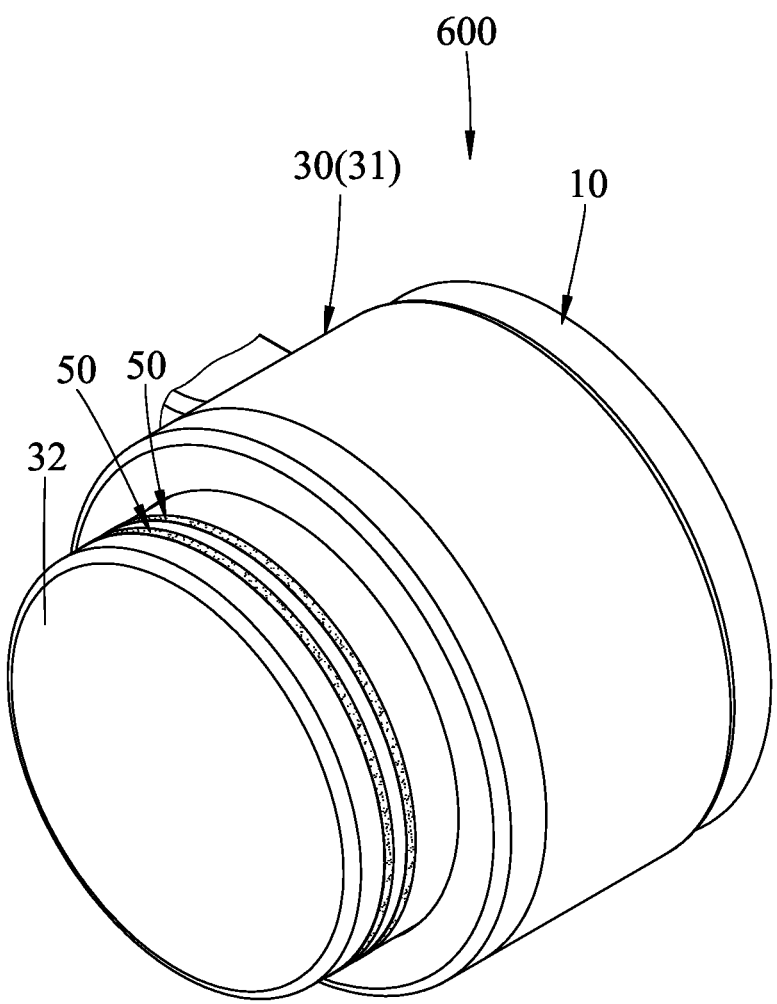
FIG. 5 is a perspective view of a suction cup device according to the embodiment of the present disclosure.
Figure 6:
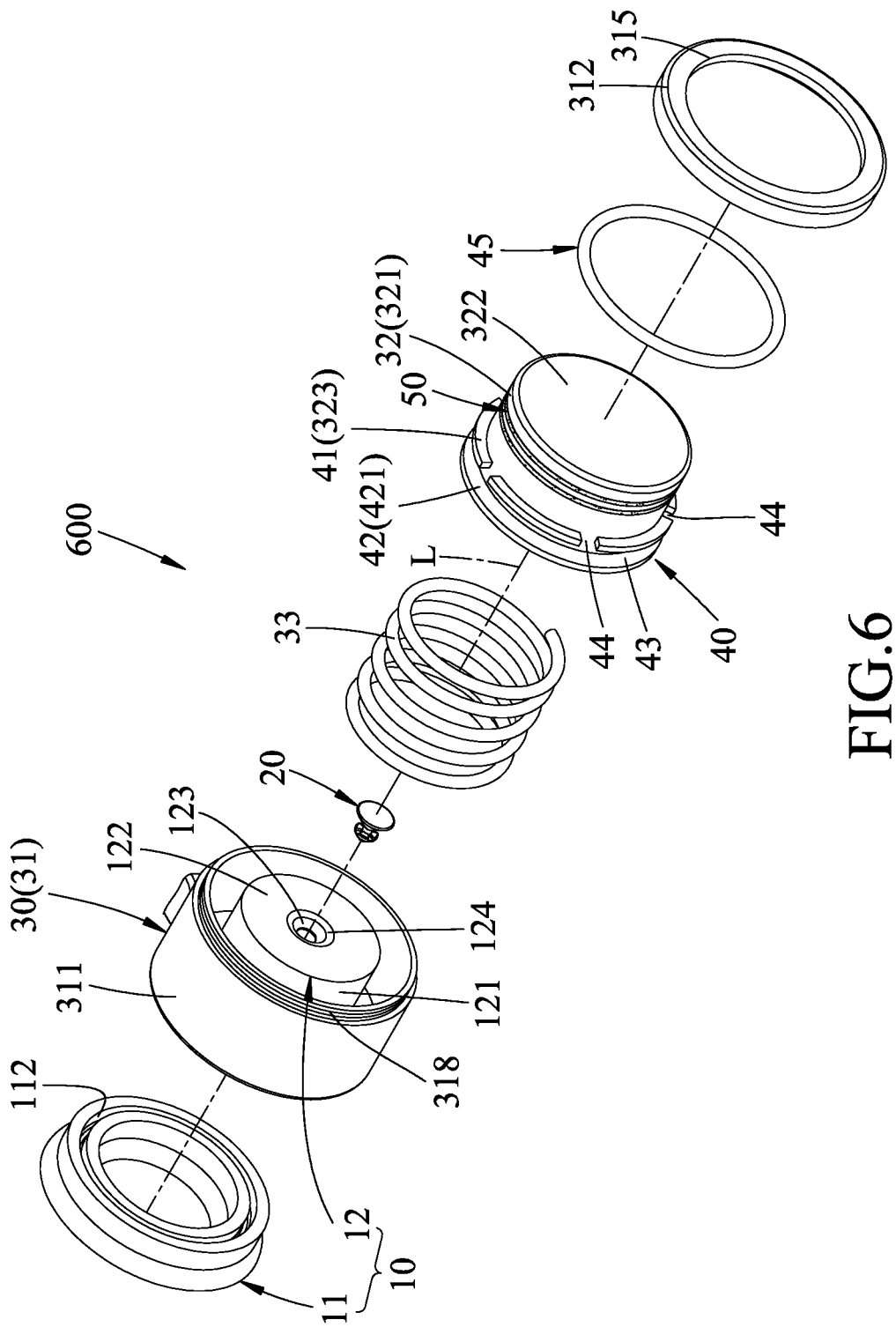
FIG. 6 is an exploded perspective view of the embodiment.
Figure 7:
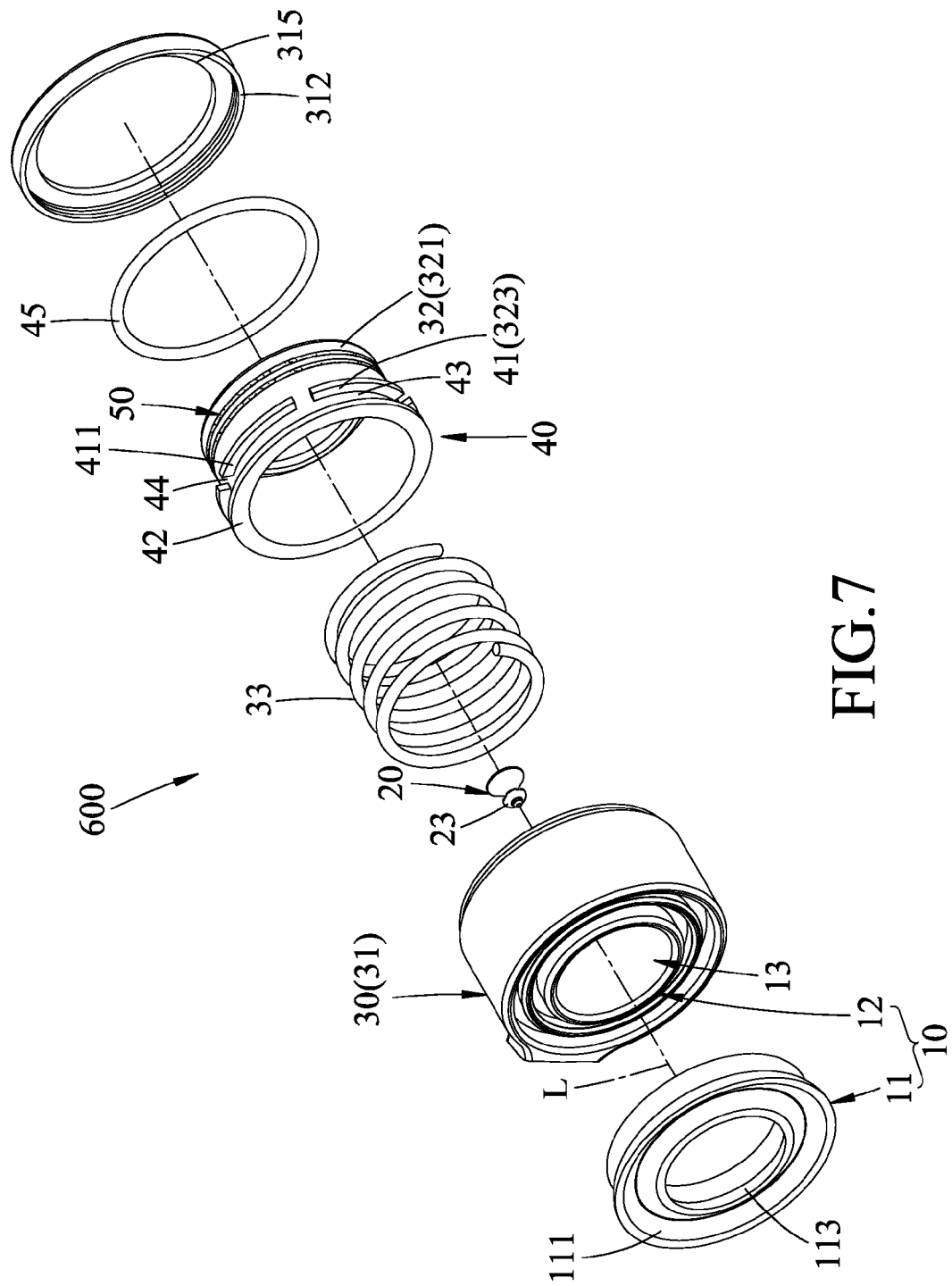
FIG. 7 is another exploded perspective view of the embodiment taken from another angle.

When the warning units 50 are exposed, as shown in FIG. 5, this means that the airtightness inside the air storage space 34 becomes poor. In this case, the pressing member 32 is simply pressed relative to the positioning seat 31 so as to return to the state, as shown in FIG. 12, thereby preventing the suction cup device 600 from falling off from the adhered support surface 100.

From the aforesaid description, the suction cup device 600 of this disclosure can produce the following effects:

1) Through cooperation of the chamber 13, the plug member 20, the air storage space 34 and the manual air vent valve 40, two spaces for storing air can be formed, that is, the chamber 13 and the air storage space 34, and in coordination with the two valves, that is, the plug member 20, which has a valve function that opens and closes the plug hole 123, and the manual air vent valve 40 for controlling air flow, the stability of adhesion of the suction cup device 600 can be ensured. Further, through the pressure balance effect, air in the chamber 13 can only flow along a single direction to the air storage space 34 through the plug member 20. Moreover, the manual air vent valve 40 can be switched from the closed state to the open state through the pressing operation of the pressing member 32, so that air can be smoothly released from the air storage space 34 to the ambient environment through the air vent channel 35.

2) In the use state, air accumulated in the chamber 13 can automatically flow to the air storage space 34 through the configuration of the plug member 20, and air can be continuously accumulated and stored through the characteristics of the air storage space 34 which has a variable volume. Further, air in the air storage space 34 can be squeezed out any time through the configuration of the manual air vent valve 40, so that airtightness between the suction cup 10 and the adhered support surface 100 can be ensured. Thus, there is no need to remove and remount the suction cup 10 from and to the adhered support surface 100.

3) Apart from biasing the pressing member 32 to move and protrude from the positioning seat 31, the restoring force of the elastic member 33 can further maintain abutment of the airtight ring 45 against the annular face 421 of the annular flange 42, thereby ensuring that the manual air vent valve 40 is always kept in the closed state.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A suction cup device comprising:
    a suction cup including a disk portion having a deformable abutment surface configured to adhere to a support surface, and a cup body connected to said disk portion and surrounding an axis, said cup body defining a chamber, and having a plug hole communicating with said chamber;
    a plug member movably disposed in said plug hole;
    a cover unit including a positioning seat airtightly connected to and covering said cup body, a pressing member movably inserted into said positioning seat, an air storage space cooperatively defined by said positioning seat, said pressing member and said cup body, and an air vent channel communicating said air storage space with an ambient environment, said air storage space having a variable volume and communicable with said chamber through said plug member, said positioning seat having a tubular shape and including a peripheral wall surrounding the axis, and a retaining ring connected to one end of said peripheral wall and defining a through hole, said pressing member being inserted into said positioning seat through said through hole, at least a portion of said pressing member being exposed from said positioning seat, said pressing member including an annular stop portion protruding from an outer peripheral surface thereof; and
    a manual air vent valve disposed on said pressing member, and including a protruding ring protruding from said outer peripheral surface of said pressing member and integrally formed as one piece with said annular stop portion, an annular flange protruding outwardly and transversely from an end of said pressing member and spaced apart from said protruding ring, an annular groove formed between said protruding ring and said annular flange, an airtight ring disposed in said annular groove, and a plurality of angularly spaced-apart flow guide holes extending through said protruding ring and said annular stop portion and communicating with said annular groove and said through hole;
    said protruding ring having an annular face facing said annular groove, said annular flange having an annular face facing said annular groove and said annular face of said protruding ring; and
    said airtight ring having a circular cross section, and a diameter smaller than a width of said annular groove measured in a direction transverse to the axis such that said airtight ring is movable in said annular groove along the axis between a first position, where said airtight ring airtightly abuts against said annular face of said annular flange to close communication between said air storage space and said air vent channel, and a second position, where said airtight ring is moved away from said annular face of said annular flange to open the communication between said air storage space and said air vent channel;
    said manual air vent valve being movable along with said pressing member to switch said air vent channel between a closed state, where said air storage space is sealed, and an open state, where air in said air storage space is released to the ambient environment through said air vent channel.

2. The suction cup device as claimed in claim 1, wherein: said cup body includes a cup surrounding wall surrounding the axis, and an end wall connected transversely to one end of said cup surrounding wall opposite to said disk portion, said cup surrounding wall and said end wall cooperatively defining said chamber, said end wall having said plug hole;
    said positioning seat further includes a positioning plate connected between said peripheral wall of said positioning seat and said cup surrounding wall;
    said peripheral wall of said positioning seat, said positioning plate and said cup body are integrally formed as one piece, and cooperate with said retaining ring to define a first space, said annular stop portion and said protruding ring being located in said first space;
    said pressing member further includes a cylindrical peripheral wall surrounding the axis and having said outer peripheral surface of said pressing member, and an end wall connected transversely to one end of said peripheral wall of said pressing member, said peripheral wall and said end wall of said pressing member cooperatively defining a second space that communicates with said first space;

said first space and said second space cooperatively form said air storage space;

said annular flange protrudes outwardly from the other end of said peripheral wall of said pressing member opposite to said end wall of said pressing member;

said air storage space has the maximum volume when said annular stop portion abuts against said retaining ring; and said air vent channel is composed of a space among said flow guide holes, said peripheral wall of said positioning seat and said peripheral wall of said pressing member, and a space between a hole wall of said through hole and said peripheral wall of said pressing member.

3. The suction cup device as claimed in claim 1, wherein said plug hole is a tapered hole having a wide end proximate to said air storage space and a narrow end proximate to said chamber.

4. The suction cup device as claimed in claim 3, wherein said plug member includes a conical plug body disposed in said plug hole, an extension extending from said plug body toward said chamber along the axis, and a limiting block extending outwardly and transversely from an outer peripheral surface of said extension and located in said chamber, said plug body being movable between a closed state, where said plug body is airtightly received in said plug hole, and an open state, where said plug body is moved away from said plug hole, said air storage space communicating with said chamber when said plug member is in said open state.

5. The suction cup device as claimed in claim 2, wherein said cover unit further includes an elastic member sleeved on cup body and having one end abutting against said end wall of said pressing member, and another end abutting against said positioning plate, said elastic member generating a restoring force that biases said pressing member to move in a direction opposite to said disk portion and to protrude from said positioning seat.

6. The suction cup device as claimed in claim 2, wherein said positioning seat further includes an annular connecting member that surrounds the axis, that projects from said positioning plate, and that has a hook end, said disk portion further having a connecting portion opposite to said deformable abutment surface and releasably engaged with said hook end.

7. The suction cup device as claimed in claim 1, further comprising at least one warning unit disposed on said outer peripheral surface of said pressing member and having a ring shape and a color different from that of said pressing member.

* * * * *